United States Patent [19]

Barnes et al.

[11] 4,281,105
[45] Jul. 28, 1981

[54] FORMATION OF PARTICULATE POLYPYRROLIDONE

[76] Inventors: Carl E. Barnes, 482 Trinity Pass, New Canaan, Conn. 06840; Arthur C. Barnes, 320 Stamford Ave., Stamford, Conn. 06902

[21] Appl. No.: 155,561

[22] Filed: Jun. 2, 1980

Related U.S. Application Data

[63] Continuation-in-part of Ser. No. 104,675, Dec. 17, 1979, abandoned, which is a continuation-in-part of Ser. No. 39,773, May 17, 1979, Pat. No. 4,217,442, which is a continuation-in-part of Ser. No. 899,066, Apr. 24, 1978, abandoned.

[51] Int. Cl.³ .............................................. C08G 69/24
[52] U.S. Cl. .................................. 528/313; 528/312; 528/319; 528/326
[58] Field of Search ................ 528/313, 312, 319, 326

[56] References Cited

U.S. PATENT DOCUMENTS

| | | | |
|---|---|---|---|
| 2,638,463 | 5/1953 | Ney et al. | 528/326 |
| 2,739,959 | 3/1956 | Ney et al. | 528/326 |
| 2,809,958 | 10/1957 | Barnes et al. | 528/326 |
| 2,973,343 | 2/1961 | Ney | 528/326 |
| 2,999,852 | 9/1961 | Renfrew et al. | 528/326 |
| 3,060,153 | 10/1962 | Follen | 528/326 |
| 3,069,392 | 12/1962 | Clark et al. | 528/326 |
| 3,174,951 | 3/1965 | Taber | 528/326 |
| 3,213,066 | 10/1965 | Renfrew | 528/326 |
| 3,721,652 | 9/1970 | Barnes | 528/326 |
| 3,835,100 | 9/1974 | Sekiguchi et al. | 528/326 |
| 4,017,465 | 4/1977 | Bacskai | 528/326 |
| 4,098,774 | 7/1978 | Bacskai | 528/315 |

OTHER PUBLICATIONS

Die Makromolekulare Chemie, 161 (1972), p. 64.

*Primary Examiner*—Harold D. Anderson

[57] ABSTRACT

A process for polymerizing 2-pyrrolidone to form a particulate material suitable for melt extrusion processes is disclosed. The process involves agitating to form particles at a critical point during the polymerization in which a friable gel exists. The gel is formed as a result of the addition of polymerization accelerators to the polymerization mixture but as the accelerated polymerization proceeds the gel soon hardens to a tough cake which can no longer be broken up by agitation. If the polymerizing mixture is agitated before the formation of the gel only very fine particles are formed.

9 Claims, No Drawings

FORMATION OF PARTICULATE POLYPYRROLIDONE

RELATED APPLICATIONS

This application is a continuation-in-part of co-pending application Ser. No. 104,675 filed Dec. 17, 1979, now abandoned which is a continuation-in-part of application Ser. No. 039,773 filed May 17, 1979, now U.S. Pat. No. 4,217,442 which in turn was a continuation-in-part of application Ser. No. 899,066 filed Apr. 24, 1978, now abandoned.

BACKGROUND OF THE INVENTION

This invention relates to the polymerization of 2-pyrrolidone and more particularly the the formation of particles* of this polymer which are suitable for melt extrustion processes by a method which is adaptable to continuous production.

*As used herein the words "particles" and "particulate" refer to material large enough to be retained on a 30 mesh sieve (U.S.A. Standard Sieve, A.S.T.M. designation E11, having an opening size of 600 micrometers) but which will ordinarily pass through a 6 mesh sieve having an opening size of 3.36 mm. Thw words "granules" and "granular" refer to material which will pass through a 30 mesh sieve.

The polymerization of 2-pyrrolidone using an alkali metal catalyst and an activator under anhydrous conditions is well-known in the art. Relative prior art is recited in the co-pending application Ser. No. 039,773. Most of the prior art discloses the method of polymerization known as "bulk polymerization" which results in the formation of an exceptionally hard, tough cake that is very difficult to grind. It must be ground, however, not only to facilitate the removal of the alkali and unpolymerized 2-pyrrolidone by washing, but also to obtain the polymer in a form which is useful for manufacturing processes, e.g. for feeding to a melt extruder. It is most desirable therefore to provide a method of making the polymer in particulate form by a direct process.

Several attempts have been made to accomplish this by means of suspension polymerization wherein the 2-pyrrolidone containing the alkaline catalyst and activator are added to a non-solvent under anhydrous conditions. The non-solvent most commonly employed is hexane or a similar hydrocarbon. The mixture is heated to the optimum polymerization temperature, usually about 50° C., and then stirred to form droplets of the 2-pyrrolidone polymerization mixture which then polymerize as separate particles. The first disclosure of the suspension polymerization of 2-pyrrolidone was in U.S. Pat. No. 2,739,959, Example 13. The resulting product was not useful because it was obtained as a very fine powder. Also the state of the art was such at that time that very low molecular weight polymers were formed. As polymerization techniques improved and higher molecular weight polymers were produced it was found that the polymerizing mixture passes through a sticky plastic phase during which it adheres strongly to the stirrer and to the walls of the polymerization vessel. U.S. Pat. No. 2,999,852 discloses a method of avoiding this problem by coating the surfaces of the polymerization vessel and stirrer with alkyl trichlorosilanes. U.S. Pat. No. 3,213,066 discloses a method of polymerizing in a ball mill in an attempt to avoid these problems.

All of these processes result in a finely divided powder which is not useful for most manufacturing processes such as feeding to a melt extruder. A method which does produce particles of a larger size is disclosed in U.S. Pat. No. 4,017,465. The method involves the addition of an inorganic salt to the polymerization mixture together with a hydrocarbon such as hexane and stirring this mixture. In order to give satisfactory results, however, about four times as much salt as 2-pyrrolidone must be used. This volume of added salt, aside from its cost, reduces the productive capacity of the reactor thereby adding significantly to production costs. It would be desirable for economic reasons to eliminate both the added salt and the added non-solvent.

It is an object of this invention to provide an inexpensive method of forming particulate polymers of 2-pyrrolidone suitable for melt extrusion purposes.

It is further object of this invention to provide a method of forming particulate polypyrrolidone which lends itself to continuous commercial production.

SUMMARY OF THE INVENTION

We have found that by agitating the polymerization mixture at a critical point during the polymerization it is possible to form particulate polymer without the addition of either an inert non-solvent or an inorganic salt thus providing more efficient use of the reactor space as well as eliminating the flamability hazard when the customary hydrocarbon non-solvent is used. The method is possible however, only when using the polymerization accelerators disclosed in our co-pending patent application Ser. No. 039,773 referred to earlier.

The addition of the polymerization accelerators causes the polymerizing mass to briefly pass through a friable gel phase after which it hardens to a tougher and tougher cake. Without the addition of an accelerator the polymerizing mass remains in a sticky plastic form until it finally hardens to a tough cake.

We have found that if the mixture is agitated by rapid stirring while it is in the gel phase and before the gel hardens, particles are formed, the size of which may be controlled by the rate of stirring. In order to prevent agglomerization the stirring should be continued for a time after the particles have been formed. After this some agitation is desirable for purposes of uniform heating.

The time at which the rapid stirring should be started is fairly critical since the friable gel phase exists only for a short period of time. Depending upon the exact formulation used, this time is in the order of about 5 minutes to about 30 minutes after which the gel has hardened to a point where it can no longer be broken up. If rapid stirring is started before the gel phase has formed, granules which are too small to be useful will result. Initial slow stirring is desirable, however, both for the purpose of providing uniform heat transfer and for observing the torque on the stirring motor. When the torque increases markedly this signals the formation of the gel phase and rapid stirring should be started shortly afterward.

DETAILED DESCRIPTION OF A PREFERRED EMBODIMENT

The invention is practiced by adding the quaternary ammonium accelerator to monomeric 2-pyrrolidone and distilling over under vacuum about 10% of the pyrrolidone to dry the hygroscopic quaternary ammonium salt. This solution after cooling is added to an anhydrous solution of an alkaline polymerization catalyst selected from any of those disclosed in our co-pending application referred to earlier, but preferably the potassium salt of 2-pyrrolidone is used. If necessary additional dry monomer may be added to adjust the concentration of the catalyst and accelerator. Polymerization is then initiated by adding preferably either $CO_2$ or $SO_2$ although $MoO_3$ may also be used.

Immediately after the initiation, instead of pouring the mixture into a polymerization bottle for bulk polymerization, it is added to a resin pot equipped with a mechanical stirrer. Dry nitrogen gas is passed through to prevent moist air from entering and the mixture is slowly stirred while heating the resin pot externally with a water bath. Polymerization will occur at temperatures ranging from about 20° to about 70° C. although when using $CO_2$ as the initiator we prefer a temperature of from about 45° to 55° C. and when using $SO_2$ we prefer a temperature of about 35° to 45° C.

After a period of time which depends upon the exact formulation used, but typically is from about 15 to 45 minutes, the mixture begins to thicken and increased torque on the stirring motor is observed. Shortly after this a friable gel is formed and at this point the rate of stirring is greatly increased which causes the gel to break up into particles. The size of the particles can be controlled by the stirring speed.

If rapid stirring is started before the gel forms or in the very earliest gel phase, the granules which are formed are too small to be useful. The exact time at which rapid stirring is started is therefore critical. Again, depending upon the exact formulation, the proper time to start the rapid stirring is usually about 1 to 3 minutes after the torque on the stirring motor suddenly increases, i.e. while in the early gel phase.

After the particles have been formed fairly rapid stirring is continued for a time in order to prevent agglomeration, but after a period of time, again depending upon the exact formulation, the tendency to agglomerate lessens and the stirring speed may be reduced. At the end of 4 to 5 hours the resin pot contains nearly dry, particles containing about 50 to 60% polymer depending upon the exact formulation. By using a quaternary ammonium bisulfate as the accelerator it is possible to obtain a substantial amount of polymer in as short a time as 45 minutes but the control of the process is more difficult.

At the end of the polymerization the particulate resin is washed with water several times to remove unpolymerized monomer, alkali and the quaternary ammonium accelerator. The resin is then dried in an oven at about 110° C. after which it may be stored. Before melt spinning, however, they must be vacuum dried to a moisture content of not more than about 0.05%.

By following the procedure disclosed in our co-pending application referred to earlier, the unpolymerized 2-pyrrolidone as well as the quaternary ammonium accelerator may be recovered.

The conversions obtained and the physical properties of the polymer formed by this polymerization process are identical to those resulting from conventional bulk polymerization when the same formulation is used. Prior art experience with suspension polymerization using a non-solvent as a suspending agent has resulted in both lower conversions as well as lower molecular weights. For example, in U.S. Pat. No. 4,017,465 the conversion obtained in the bulk polymerization experiment (Example 1) was 43.3% after a polymerization time of 22 hours at about 50° C. The viscosity of the polymer formed is reported as being greater than tube z on the Gardner scale. In the best suspension polymerization experiment (Example 5) the conversion is reported as 24.8% after 20 hours at 50° C. and the viscosity is lower being between W and X on the Gardner scale (i.e. about 12 Stokes versus about 25 Stokes for the bulk polymer). Possibly the lower conversion as well as the lower viscosity is due to the added inorganic salt. In any event, in our process which uses neither a non-solvent nor an added inorganic salt the conversions and the molecular weights are not adversely affected.

The following examples are intended to illustrate the invention more fully but are not intended to limit its scope.

EXAMPLE 1

32.1 grams (0.072 mol) of tetra n-butyl ammonium bisulfate was added to 150 grams of purified 2-pyrrolidone and 25 grams of the pyrrolidone was distilled over under vacuum to dry the hygroscopic quaternary ammonium salt. 0.018 mol of $SO_2$, diluted with nitrogen, was added to this solution.

9.6 grams of 85% potassium hydroxide (0.144 mol of 100% KOH) was added to 150 grams of purified 2-pyrrolidone and 25 grams was distilled over under vacuum to form an anhydrous solution of potassium pyrrolidonate.

The two solutions were mixed and added to a resin pot equipped with a mechanical stirrer. The resin pot was heated to 40° C. by means of an external water bath and the mixture stirred very slowly to effect heat transfer, as well as to observe the point of increased torque on the stirring motor.

After about 30 minutes considerable more power had to be applied to the stirrer to maintain its slow speed. A few minutes after this the polymerizing mass was in the form of a gel and at this point rapid stirring was induced causing the gel to break up into particles. After the particles were formed rapid stirring was continued for about an additional 30 minutes to keep the particles in motion and thus eliminate a tendency for them to agglomerate. At the end of this time the rate of stirring was reduced somewhat but continued for a total elapsed time of 3½ hours. The particles were then removed and washed five times with water to dissolve the alkali, unchanged monomer and the quaternary ammonium salt. After drying the conversion was found to be 60% based on the available monomer and the viscosity was 5.5 Stokes when measured as a 5% solution in 88% formic acid by the Gardner Bubble Tube method (tube T). This is equivalent to an inherent viscosity of 4.23 dl/g when measured as a 0.2 g/dl solution in hexafluoroisopropanol at 25° C.

EXAMPLE 2

The procedure of Example 1 was followed except that 10.7 grams (0.036 mol) of methyl tri n-butyl ammonium bisulfate was used in place of the tetra n-butyl ammonium bisulfate and 8.0 grams of 85% potassium hydroxide (0.12 mol of 100%) was used instead of 9.6 grams. After about 30 minutes the torque on the stirring motor increased as the gel began to form. Shortly after this stirring was speeded up causing the gel to break up into particles. After 3½ hours the particles were removed, washed several times with water and dried at about 110° C. in an oven. The conversion was found to be 58% and the viscosity was 15 Stokes (between Gardner tubes X and Y) corresponding to an inherent viscosity of 5.1 dl/g as determined in hexafluoroisopropanol.

EXAMPLE 3

The procedure of Example 1 was followed except that 30.0 grams (0.06 mol) of methyl tri n-butyl ammonium sulfate was used in place of the tetra n-butyl ammonium bisulfate and 8.5 grams of 85% potassium hydroxide (0.129 mol of 100%) was used instead of 9.6 grams.

After the torque on the stirring motor increased, the mixture was stirred more rapidly causing the formation of particles. Stirring was continued for 4 hours, more slowly during the last 3 hours, and then the particles were removed, washed with water and dried. The total elapsed time after the $SO_2$ addition was 4½ hours. The conversion was found to be 54% and the viscosity 36 Stokes (Gardner tube Z-2).

EXAMPLE 4

9.63 grams of 85% potassium hydroxide (0.146 mol of 100%) was added to 120 grams of purified 2-pyrrolidone and 28.7 grams distilled over under vacuum leaving an anhydrous solution of potassium pyrrolidonate in the still pot. After cooling this solution was poured into a bottle and tightly capped.

An accelerator solution was prepared by adding 37.1 grams (0.064 mol) of tetra n-butyl ammonium sulfate to 140 grams of purified 2-pyrrolidone and distilling over 32.8 grams under vacuum to insure dryness. After cooling this solution to room temperature the potassium pyrrolidonate solution in the bottle was added to it and polymerization initiated by adding 0.015 mol of $SO_2$ diluted with nitrogen gas. The mixture was added to a dried resin pot equipped with a mechanical stirrer. Provision was made for a current of dry nitrogen gas to be passed through to prevent moist air from entering. The resin pot was surrounded with a water bath maintained at 40° C. and slow stirring was started.

After about 30 minutes the torque on the stirring motor increased as the mixture passed into the friable gel phase and shortly after this the rate of stirring was increased substantially causing the mixture to break up into particles. Rapid stirring was continued for about an hour to prevent agglomerization after which it was slowed somewhat.

The particles were removed 4 hours after the addition of the $SO_2$, washed several times with water, then dried at 110° C. in an oven overnight. The conversion was found to be 59% and the viscosity was greater than 63 Stokes corresponding to an IV of greater than 6.36 d;/g in hexafluoroisopropanol.

EXAMPLE 5

The procedure of Example 4 was followed except that 11.35 grams of 85% KOH (0.173 mol of 100%) was used instead of 9.63 grams. The increased torque on the stirring motor was observed in 15 minutes after the adddition of the $SO_2$ rather than after 30 minutes as in Example 4. After washing and drying the granules the conversion was found to be 67.3% after a total elapsed time of 5 hours after the $SO_2$ addition. The viscosity was greater than 63 Stokes, corresponding to a molecular weight of over 1 million.

The foregoing examples demonstrate that when using the polymerization accelerators disclosed on our co-pending application Ser. No. 039,773, particulate polymers of 2-pyrrolidone may be formed without the addition of an inert non-solvent or an inorganic salt by inducing rapid stirring at a critical point. This critical point occurs shortly after the formation of a weak friable gel phase and before the polymerizing mass passes into a tougher polymer cake. Depending upon the exact formulation employed, this critical point may be of only a few minutes duration.

Although sulfur dioxide has been used in the examples, we have found that carbon dioxide may also be used as the polymerization initiator with essentially the same results. When using carbon dioxide, however, we prefer to use a polymerization temperature of about 50° C. rather than about 40° C.

We claim:

1. A process for forming particulate polypyrrolidone comprising heating at a temperature of from about 20° to about 70° C. an anhydrous mixture comprising 2-pyrrolidone, an alkaline polymerization catalyst, a polymerization accelerator selected from the group consisting of quaternary ammonium sulfates and bisulfates and a polymerization initiator selected from the group consisting of $CO_2$, $SO_2$ and $MoO_3$ thereby causing the formation of a friable gel phase of short duration as the polymerization proceeds and agitating the mass while in this phase.

2. The process described in claim 1 wherein the alkaline polymerization catalyst is potassium pyrrolidonate.

3. The process described in claim 1 wherein the polymerization initiator is $CO_2$.

4. The process described in claim 1 wherein the polymerization initiator is $SO_2$.

5. The process according to claim 1 wherein the polymerization accelerator is tetra n-butyl ammonium sulfate.

6. The process according to claim 1 wherein the polymerization accelerator is methyl tri n-butyl ammonium sulfate.

7. The process according to claim 1 wherein the polymerization accelerator is tetra n-butyl ammonium bisulfate.

8. The process according to claim 1 wherein the polymerization accelerator is methyl tri n-butyl ammonium bisulfate.

9. The process of agitating at a critical point during the anionic polymerization of 2-pyrrolidone, said critical point being the brief period in which a friable gel is formed and before this gel becomes a tough cake, the friable gel being formed as a result of adding to the polymerization mixture a polymerization accelerator selected from the group consisting of quaternary ammonium sulfates and bisulfates, whereby a particulate polypyrrolidone is formed.

* * * * *